(12) United States Patent
An et al.

(10) Patent No.: US 11,203,531 B2
(45) Date of Patent: Dec. 21, 2021

(54) METHOD FOR INHIBITING EXTRACTANT DEGRADATION OF DSX PROCESS THROUGH MANGANESE EXTRACTION CONTROL

(71) Applicant: KOREA RESOURCES CORPORATION, Wonju-si (KR)

(72) Inventors: Jeon Woong An, Wonju-si (KR); Youn Kyu Yi, Wonju-si (KR); Seung Ho Lee, Ansan-si (KR)

(73) Assignee: KOREA RESOURCES CORPORATION, Wonju-si (KR)

( * ) Notice: Subject to any disclaimer, the term of this patent is extended or adjusted under 35 U.S.C. 154(b) by 305 days.

(21) Appl. No.: 16/523,243

(22) Filed: Jul. 26, 2019

(65) Prior Publication Data

US 2021/0024366 A1    Jan. 28, 2021

(51) Int. Cl.
| | | |
|---|---|---|
| *C01G 45/00* | (2006.01) | |
| *C01G 45/10* | (2006.01) | |
| *C01G 51/00* | (2006.01) | |
| *C22B 19/20* | (2006.01) | |
| *C22B 47/00* | (2006.01) | |
| *C22B 3/00* | (2006.01) | |
| *C01G 9/00* | (2006.01) | |

(52) U.S. Cl.
CPC .......... *C01G 45/003* (2013.01); *C01G 9/003* (2013.01); *C01G 45/10* (2013.01); *C01G 51/003* (2013.01); *C22B 19/20* (2013.01); *C22B 23/0461* (2013.01); *C22B 47/00* (2013.01)

(58) Field of Classification Search
CPC ...... C01G 45/003; C01G 45/10; C01G 9/003; C01G 51/003; C22B 19/20; C22B 23/0461; C22B 47/00
See application file for complete search history.

(56) References Cited

U.S. PATENT DOCUMENTS

2007/0248514 A1* 10/2007 Cheng .................... C22B 3/404
                                                            423/139

* cited by examiner

*Primary Examiner* — Steven J Bos
(74) *Attorney, Agent, or Firm* — Cantor Colburn LLP

(57) ABSTRACT

Provided is a method for inhibiting extractant degradation in the DSX process through the manganese extraction control, the method comprising: (a) stirring DSX solvent and DSX feed solution, which is a solution containing a valuable metal from which iron has been removed in an agitator, in which soda ash ($Na_2CO_3$) is further added to maintain a constant pH; and (b) scrubbing the manganese from the DSX solvent, extracted in step (a).

7 Claims, 5 Drawing Sheets

METHOD FOR INHIBITING EXTRACTANT DEGRADATION OF DSX PROCESS THROUGH MANGANESE EXTRACTION CONTROL

BACKGROUND OF THE INVENTION

1. Field of the Invention

The present invention relates to a method for inhibiting the degradation of an extractant, and more particularly, to a method for minimizing the extraction of manganese, which is a main impurity for the extractant degradation through pH control in the cobalt-zinc solvent extraction (synergistic solvent extraction, hereinafter referred to as DSX) of the Boleo mine so as to effectively inhibit the degradation of the extractant.

2. Description of the Related Art

The DSX process is a process for simultaneously extracting cobalt (Co) and zinc (Zn) using two solvents. In order to increase the extraction rate, soda ash ($Na_2CO_3$) is added to adjust the optimum pH.

The soda ash added by the above-mentioned method increases the extraction rate by adjusting the pH, but it reacts with cobalt or manganese so that cobalt carbonate ($CoCO_3$) or manganese carbonate ($MnCO_3$) are precipitated to lower the extraction rate and to cause degradation of the extractant, resulting in difficulty to recover cobalt and zinc.

The higher the pH adjusted by the above-mentioned method, the higher the extraction rate of cobalt (Co) and zinc (Zn) to be recovered. However, the extraction rate of manganese, cadmium and copper ions acting as impurities becomes higher as well.

The manganese extracted by the above-mentioned method is the main cause of the degradation of oxime, which is an extractant, and the high manganese extraction causes the degradation of the extractant in the DSX process.

When the extractant is decomposed by the above-mentioned method, the extracted impurities (cobalt, zinc, manganese, cadmium, copper ions, etc.) overload the extraction capacity of the oxime in extractants, which increases the mol total metal/mol oxime to accelerate the degradation of extractants.

When the degradation of the extractant is accelerated by the above-mentioned method, the extraction capacity of the oxime in the process is decreased, thereby also reducing the extraction rate of cobalt and zinc to be recovered.

If the extraction rate is lowered by the abovementioned method when operating the process, it tends to increase a pH higher than the optimum pH for increasing the extraction rate. However, this accelerates the degradation of the extractant.

When the extraction rate is lowered, the extractant needs to be continuously supplied in an amount equal to or greater than the decomposed amount. The degradation of the extractant is accelerated, thereby requiring an additional feed of an enormous amount of extractant. If this deteriorates further, the degradation of the extractant cannot be reversed, and the DSX process must be stopped. If the DSX process is re-operated, it will incur enormous economic losses because all the solvents (all the decomposed extractants) input into the DSX process are removed and re-input into the DSX process.

In general solvent extraction, metals should be extracted up to the maximum capacity of the extractant in view of an economic point, but the DSX process cannot be operated in the same manner as conventional solvent extraction to prevent degradation of the extractant due to overloading of the extraction capacity.

For example, in the copper solvent extraction, copper is extracted up to the maximum capacity of the extractant while maintaining an appropriate pH. The above-mentioned method has an economic advantage in that an extractant is not required to be excessively added to the process. In addition, it is economical to prevent the extraction of iron acting as an impurity in the subsequent step and further eliminate the process of removing the impurities.

However, if valuable metals are extracted while using the maximum amount of extractant in the DSX process as in general solvent extraction, it causes an overload of the oxime among extractants and increases the mol total metal/mol oxime, thereby causing degradation of the extractant. Due to the different operating methods as described, the DSX process suffers from the difficulty to operate in the same manner as conventional solvent extraction.

SUMMARY OF THE INVENTION

Accordingly, an object of the present invention is to provide a novel method for minimizing the extraction of manganese, which is a major impurity of the extractant degradation and effectively inhibiting the extractant degradation, through pH control in the extraction step in the Boleo cobalt/zinc solvent extraction process (DSX).

In order to achieve the above-mentioned object, the present invention provides a method for inhibiting extractant degradation in the DSX process through the manganese extraction control, the method comprising: (a) stirring DSX solvent and DSX feed solution, which is a solution containing a valuable metal from which iron has been removed by a step of removing iron, in which soda ash ($Na_2CO_3$) is further added to maintain a constant pH; and (b) scrubbing the manganese from the DSX solvent, extracted in step (a).

Further, the present invention provides a method for inhibiting extractant degradation in the DSX process through the manganese extraction control, in which a plurality of agitators is used in step (a), and the DSX feed solution and DSX solvent extracting cobalt and zinc in the first agitator are sequentially treated in the same manner in the next agitator.

Further, the present invention provides method for inhibiting extractant degradation in the DSX process through the manganese extraction control, in which the DSX feed solution of step (a) includes cobalt (Co) and zinc (Zn), wherein the raffinate further include aluminum (Al) and manganese (Mn), and wherein the raffinate further include at least one of cadmium (Cd), copper (Cu), potassium (K), magnesium (Mg), calcium (Ca), sodium (Na), and nickel (Ni).

Further, the present invention provides a method for inhibiting extractant degradation in the DSX process through the manganese extraction control, in which the DSX solvent of step (a) is a mixture of an extractant and kerosene, which is a diluent, and the extractant includes aliphatic hydroxy oxime and neodecanoic acid in a volume ratio of 1:0.5 to 4.0.

Further, the present invention provides a method for inhibiting extractant degradation in the DSX process through the manganese extraction control, in which DSX solvent and DSX feed solution are input in a volume ratio of 1:0.5 to 2 in step (a), and the stirring temperature is 35° C. to 55° C. and the stirring time is 0.5 minutes to 3 minutes in step (a).

Further, the present invention provides a method for inhibiting extractant degradation in the DSX process through the manganese extraction control, in which the concentration of soda ash ($Na_2CO_3$) added in step (a) is 5% by weight to 30% by weight and pH of solution in the reactor is 3 to 7 during the stirring.

Further, the present invention provides a method for inhibiting extractant degradation in the DSX process through the manganese extraction control, in which step (b) of scrubbing the manganese includes: stirring the DSX solvent with the manganese extracted with the DSX scrubbing solution, in which zinc sulfate ($ZnSO_4$) is added and dissolved, so that the manganese is removed from the solvent to the scrubbing solution.

The present invention has effects of minimizing the extraction of manganese, which is a major impurity of the extractant degradation, and effectively inhibiting the extractant degradation, through pH control in the extraction step in the Boleo cobalt/zinc solvent extraction process (DSX).

DETAILED DESCRIPTION OF THE PREFERRED EMBODIMENT

Hereinafter, a preferred exemplary embodiment of the present invention is described in more detail. In the following description of the present invention, a description of commonly known functions and configurations incorporated herein is omitted so as to avoid obscuring the concept of the present invention.

The term of degree, such as "about", "substantially", and the like are used in the present specification in the sense of "at, or nearly at, when given the manufacturing and material tolerances inherent in the stated circumstances" and are used to prevent the unscrupulous infringer from unfairly taking advantage of the invention disclosure where exact or absolute figures are stated as an aid to understanding the invention.

Hereinafter, embodiments of the present invention are described in detail with reference to the accompanying drawings such that the present invention is readily apparent to those skilled in the art to which the present invention pertains. The present invention may be embodied in many different forms and is not limited to the embodiments described herein.

Figure 1:
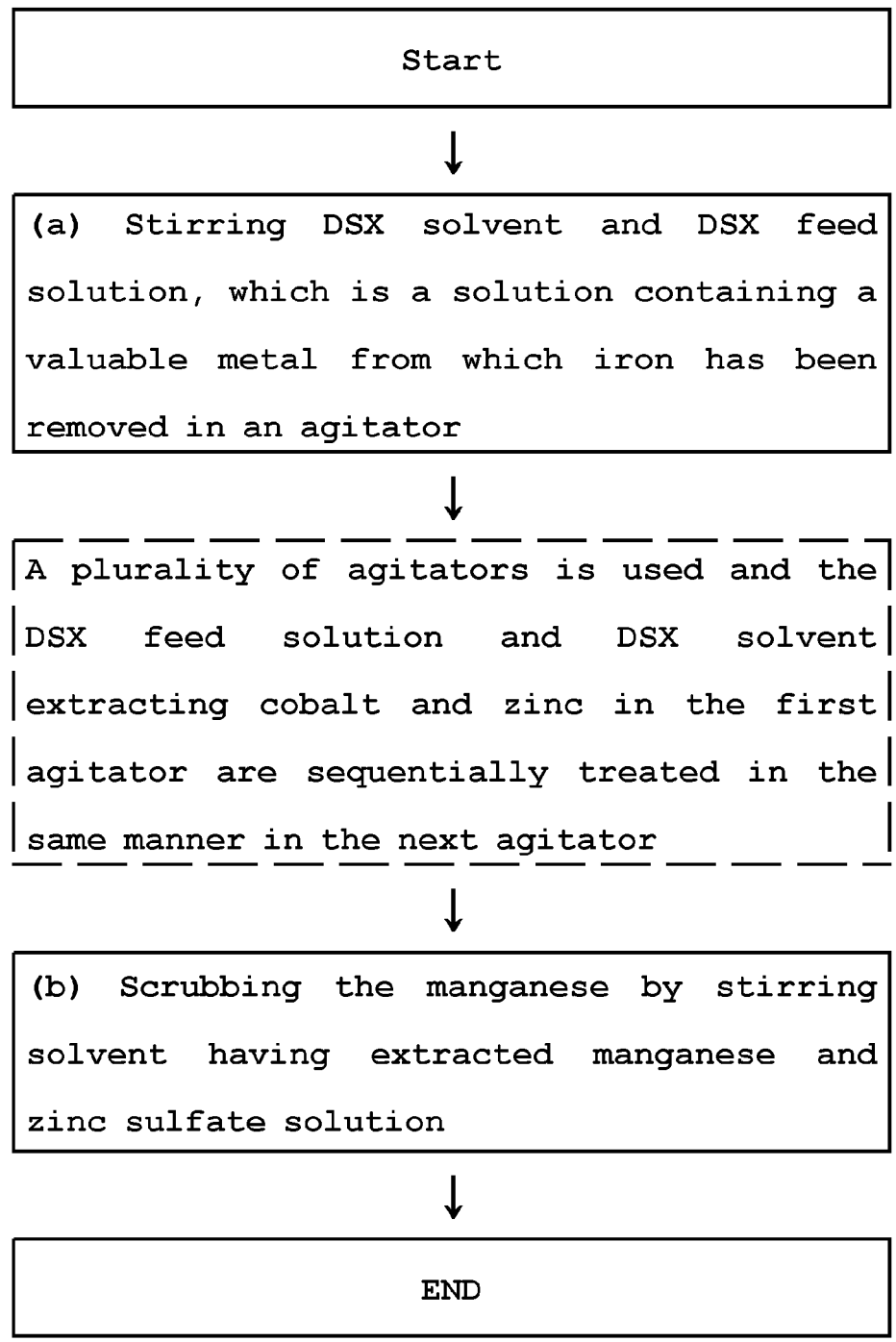
FIG. 1 is a flow chart of a method for inhibiting the extractant degradation in a DSX process through manganese extraction control of the present invention.

FIG. 1 is a flow chart of a method for inhibiting the extractant degradation in a DSX process through manganese extraction control of the present invention.

More specifically, the present invention may be configured as the method for inhibiting extractant degradation in the DSX process through the manganese extraction control, the method comprising: (a) stirring DSX solvent and DSX feed solution, which is a solution containing a valuable metal from which iron has been removed by a step of removing iron, in which soda ash ($Na_2CO_3$) is further added to maintain a constant pH; and (b) scrubbing the manganese from the DSX solvent, extracted in step (a).

In step (a), for example, the valuable metal contained in the iron-removed solution may include cobalt (Co), zinc (Zn), and the like. The valuable metal contained in the iron-removed solution contains about 50 ppm to about 300 ppm of cobalt, and about 200 ppm to about 1000 ppm of zinc.

The iron-removed solution includes manganese (Mn) and copper (Cu), and may include, as impurities, cadmium (Cd), potassium (K), magnesium (Mg), calcium (Ca), sodium (Na), aluminum (Al), nickel (Ni), and the like.

The DSX solvent may include an oxime-based extractant, a neodecanoic acid extractant, kerosene as a diluent, and the like.

The volume ratio of, as the extractants, the aliphatic hydroxy oxime to neodecanoic acid preferably is 1:0.5 to 4.0.

In step (a), the DSX feed solution and the DSX solvent may be subjected to a solvent extraction process several times using one agitator or a plurality of agitators in order to extract cobalt and zinc. In other words, a plurality of agitators may be used in step (a), and the DSX feed solution and DSX solvent extracting cobalt and zinc in the first agitator may be sequentially treated in the same manner in the next agitator. In each of the agitators, the ratio of the DSX solvent to the DSX feed solution is 0.5 to 2 at the time of stirring, and the stirring is performed at the temperature of from 35° C. to 55° C. for 0.5 minutes to 3 minutes.

Figure 2:
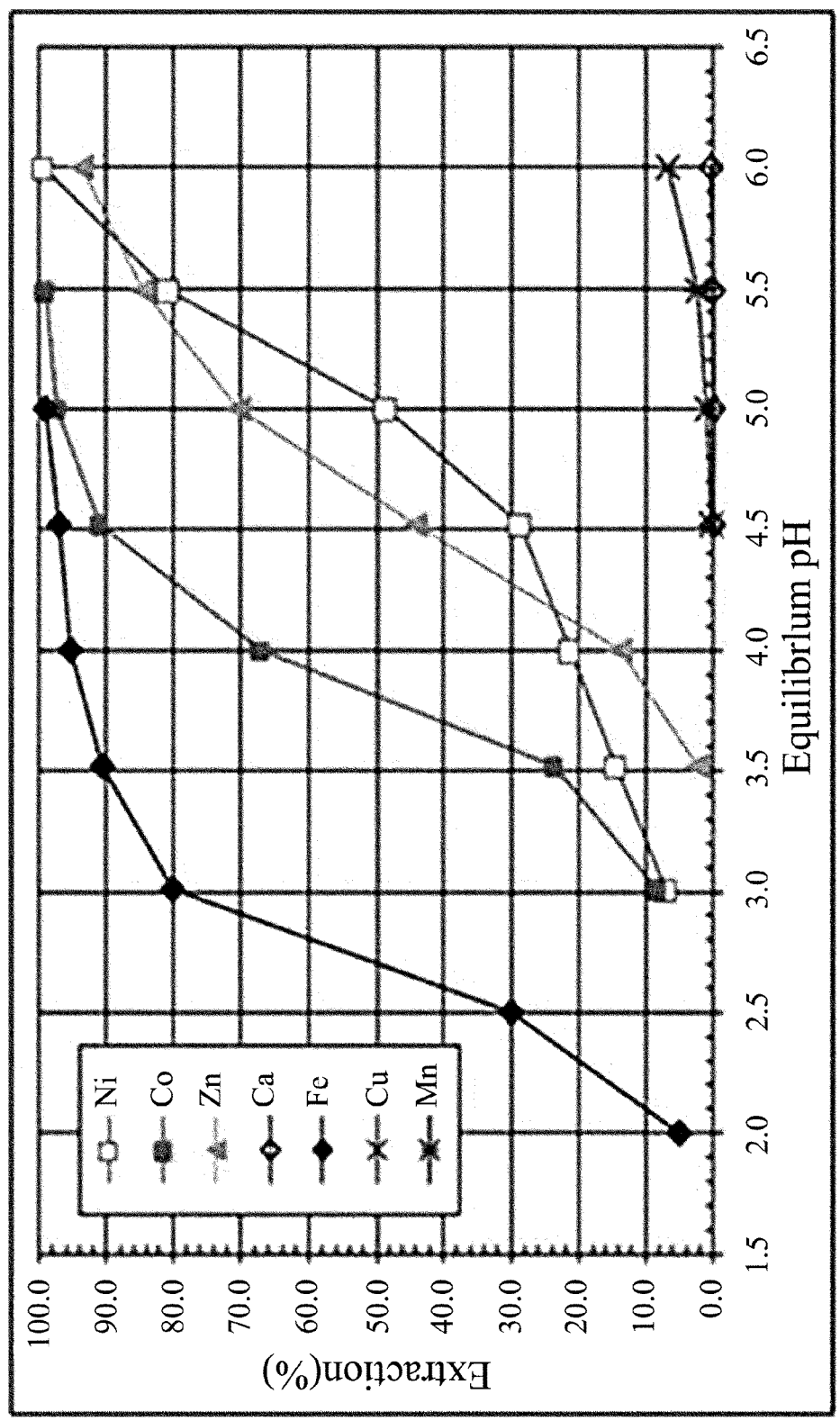
FIG. 2 shows the extraction isotherm curve according to one embodiment of the present invention.
Figure 3:
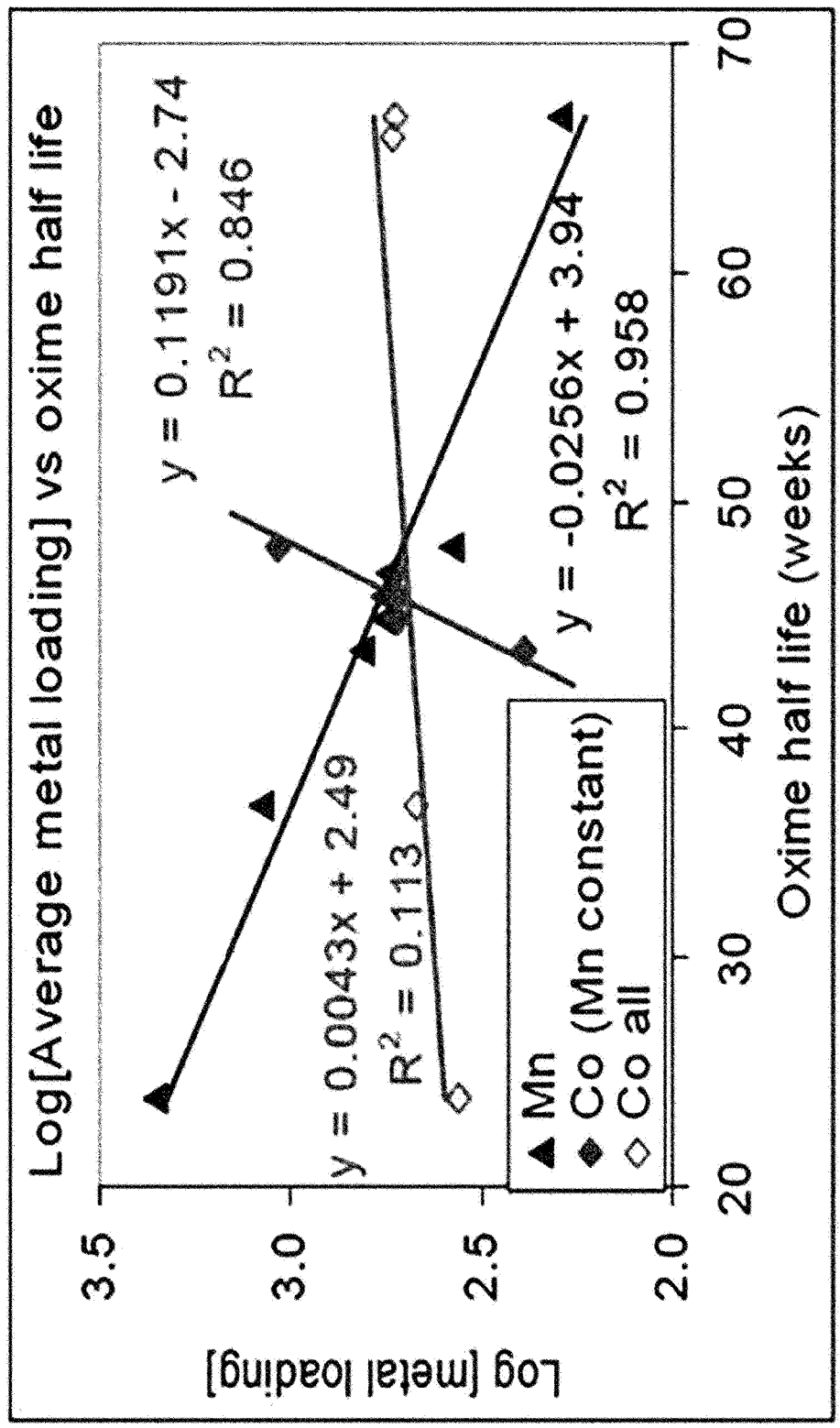
FIG. 3 shows the manganese concentration and the oxime half-life contained in the solvent according to an embodiment of the present invention.

FIGS. 2 and 3, respectively, show extraction isotherm curves, which are indicators of pH control as below to inhibit manganese extraction, and manganese concentrations and oxime half-life when manganese is extracted in a solvent.

FIG. 2 shows the extraction isotherm curve according to one embodiment of the present invention.

This graph is a graph showing the metal extraction rate according to pH change at the same temperature. In this graph, the starting pH and the limiting pH of the extraction are indicated, and the pH range used as an index of the operation is shown. This graph indicates that cobalt is extracted into the solvent in the range of pH 3 to pH 5.5, and the extraction rate is higher as the pH is closer to 5.5.

Zinc is extracted into the solvent in the range of pH 3.5 to pH 6. As the pH is closer to the higher region, manganese, calcium, nickel and copper, which are impurities, are extracted into the solvent. Thus, pH control is necessary.

In order to avoid the impurities such as manganese and copper, and to recover the maximum amount of cobalt and zinc, the pH used as an indicator of the operation in the DSX process is adjusted to 4 to 5.

In FIG. 3, each point (metal according to color) is the half-life test result according to the individual metal loading concentration. In manganese, the more the loading amount, the shorter the half-life.

The loading of cobalt alone has no correlation with the cobalt loading concentration and the half-life period due to solvent degradation. It is the indicator that manganese loading is lowered because cobalt cannot be loaded except for manganese in the DSX process.

In the DSX process feed solution and the extraction step, pH adjustment is necessary in conjunction with the extraction isotherm curve in FIG. 2 to prevent the manganese loading amount from increasing by adjusting the pH.

Figure 4:
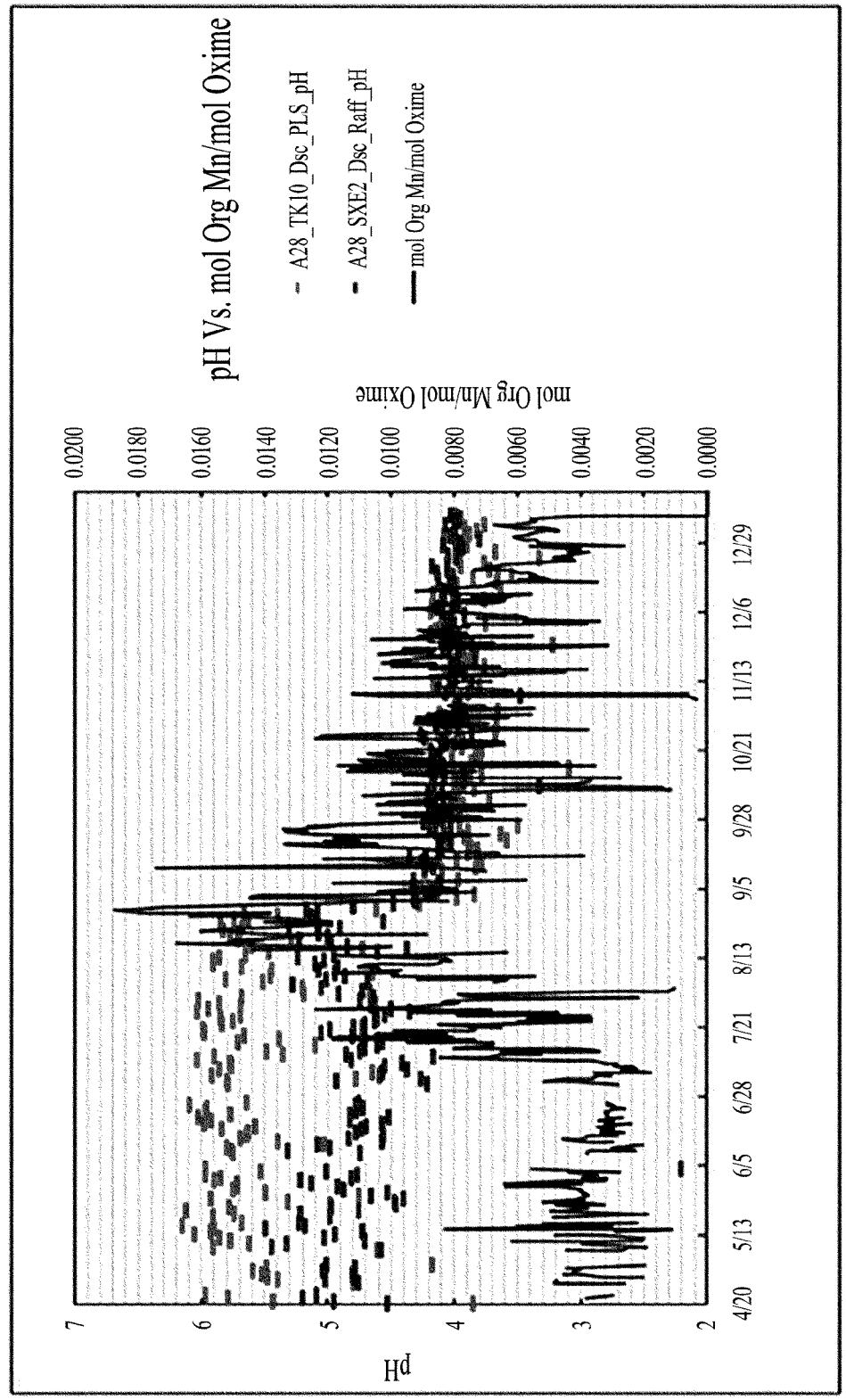
FIG. 4 shows the amount of manganese metal extracted (loaded) per unit oxime by pH according to one embodiment of the present invention.

FIG. 4 shows the amount of manganese metal extracted (loaded) per unit oxime by pH control as below.

Higher pH results in loading cobalt and zinc as well as impurities such as manganese at the extraction stage, which increases the mol total metal/mol oxime and causes the degradation of the extractant.

Thus, the process is operated while the pH is maintained at a low level, and it is confirmed that the mol manganese/mol oxime is lowered over time, and as a result, the degradation phenomenon of the solvent is reduced.

In the present invention, a method of minimizing manganese extraction for inhibiting degradation of DSX solvent, an extractant, soda ash ($Na_2CO_3$) must be added to control pH in step (a) for inhibiting manganese extraction in step (a). Further, in order to inhibit local pH increase, the soda ash ($Na_2CO_3$) is added at a concentration of 5% by weight to 30% by weight, preferably 5% by weight to 25% by weight, and more preferably 10% by weight to 20% by weight. During the extraction, the reaction is carried out at pH 3 to 7, preferably pH 3.5 to 6 and more preferably pH 4 to 5.

In addition to soda ash ($Na_2CO_3$), caustic soda (NaOH) may be used as the pH adjuster.

In step (a), even though a plurality of agitators is used for the solvent extraction, the mixture is stirred at a pH of 4 to 5 in all the agitators at a temperature of 35° C. to 55° C. for 0.5 minutes to 3 minutes.

In the case of using single agitator or plural agitators in step (a), cobalt and zinc can be recovered by the following reaction formulas 1 to 3.

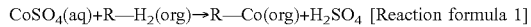
$CoSO_4(aq)+R—H_2(org) \rightarrow R—Co(org)+H_2SO_4$ [Reaction formula 1]

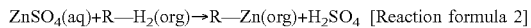
$ZnSO_4(aq)+R—H_2(org) \rightarrow R—Zn(org)+H_2SO_4$ [Reaction formula 2]

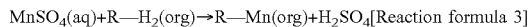
$MnSO_4(aq)+R—H_2(org) \rightarrow R—Mn(org)+H_2SO_4$ [Reaction formula 3]

In step (a), the extraction may be carried out by repeating the reaction formulas two or more times.

Cobalt and zinc can be recovered by DSX solvent in step (a). Even though the extraction of manganese, an impurity, is inhibited, a small amount of manganese is extracted.

In step (b), impurities such as manganese (Mn), copper (Cu), cadmium (Cd), potassium (K), magnesium (Mg), calcium (Ca), sodium (Na), aluminum (Al), nickel (Ni), and the like are included except cobalt and zinc recovered therein after step (a). Since manganese (Mn) needs to be removed from the impurities, it can be removed through a scrubbing step.

The scrubbing step is performed according to the following reaction formula, and thus manganese (Mn), which is an impurity, can be removed.

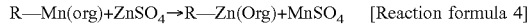
$R—Mn(org)+ZnSO_4 \rightarrow R—Zn(Org)+MnSO_4$ [Reaction formula 4]

In step (b), impurities can be removed twice or more times in the reaction formula.

Consequently, in step (b), the manganese-removed solvent can be recovered by the above reaction formulas.

Figure 5:
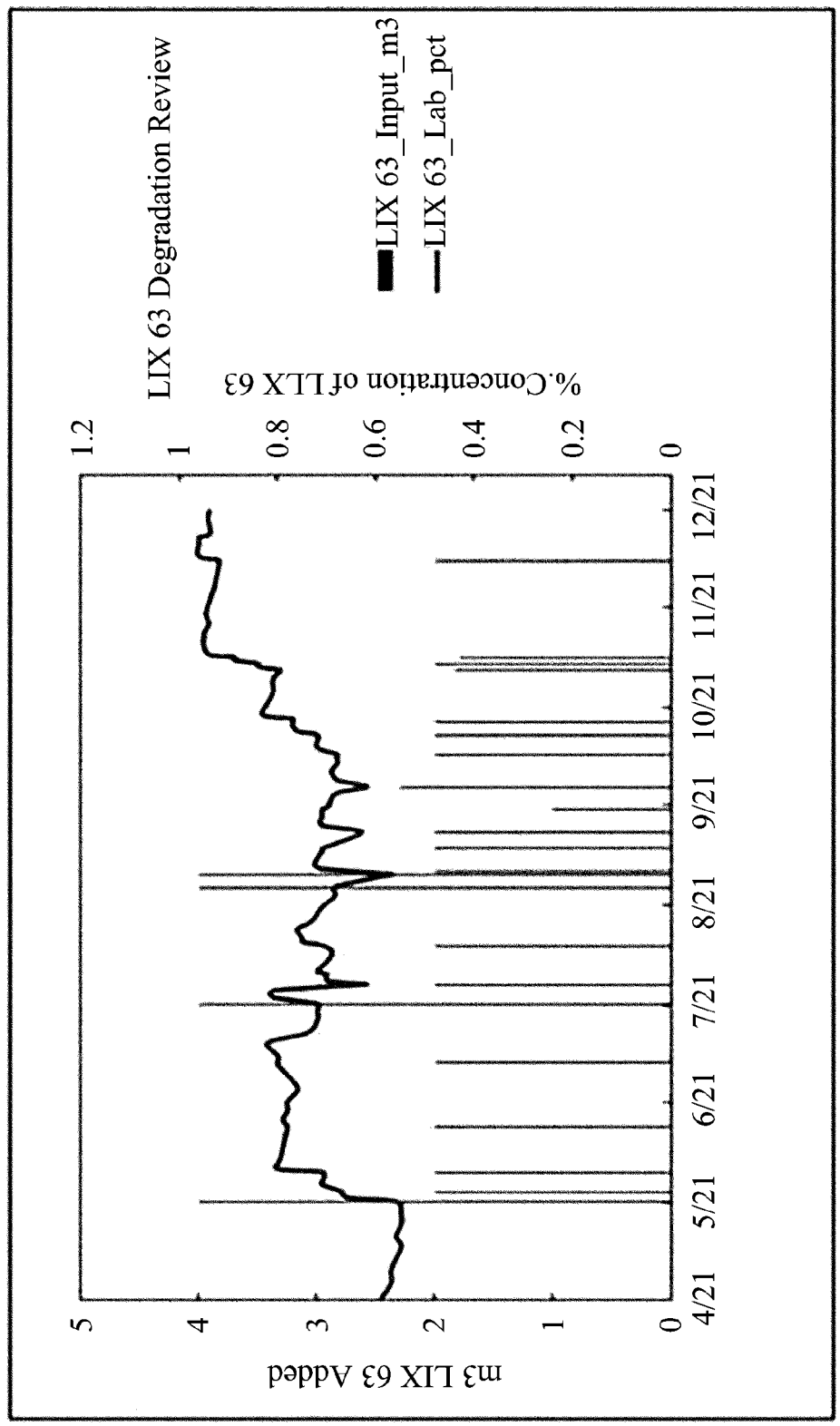
FIG. 5 shows the inhibition of the extractant degradation according to one embodiment of the present invention.

FIG. 5 shows the maintenance of the extractant concentration by inhibiting the extractant degradation when controlling manganese through steps (a) and (b).

As shown in FIG. 5, the basic y-axis of the graph is the input amount ($m^3$) of the extractant oxime (LIX 63), and the auxiliary y-axis of the graph is the analysis result of oxime (%).

When the pH is maintained low, and the mol total metal/mol oxime is kept low in association with the above-described pH adjustment and the graph of the mol total metal/mol oxime, even when a similar amount of oxime is added, the oxime concentration (%) is increased, and the amount of degradation of the solvent is decreased.

A high oxime concentration means a high mol oxime, and it can be seen that a low value of mol total metal/mol oxime is maintained, indicating a virtuous cycle.

The mol oxime is increased, and the mol total metal/mol oxime is lowered, and thus the degradation is reduced so that the oxime concentration is kept high. When the extractant is added, the mol total metal/mol oxime is further lowered.

Further, the present invention can prolong the lifetime of the extractant used in the DSX process by the above-described method of inhibiting degradation of the extractant.

It will be apparent to those skilled in the art that the present invention described above is not limited to the above-described embodiment and the accompanying drawings, and various substitutions, modifications and variations can be made without departing from the technical spirit of the inventions.

What is claimed is:

1. A method for inhibiting extractant degradation in a DSX synergistic solvent extraction process, the method comprising:
   (a) stirring a synergistic solvent extraction solvent and a synergistic solvent extraction feed solution, which is a solution containing a valuable metal from which iron has been removed, and adding soda ash to maintain a constant pH, wherein manganese is extracted into the synergistic solvent extraction solvent; and
   (b) scrubbing the manganese from the synergistic solvent extraction solvent after step (a).

2. The method of claim 1, wherein a plurality of agitators is used in step (a).

3. The method of claim 1, wherein the synergistic solvent extraction feed solution of step (a) includes cobalt (Co) and zinc (Zn),
   the synergistic solvent extraction solvent after step (a) further includes aluminum (Al) and manganese (Mn), and
   the synergistic solvent extraction solvent after step (a) further include at least one of cadmium (Cd), copper (Cu), potassium (K), magnesium (Mg), calcium (Ca), sodium (Na), and nickel (Ni).

4. The method of claim 1, wherein the synergistic solvent extraction solvent of step (a) is a mixture of an extractant and kerosene, which is a diluent, and
   the extractant includes aliphatic hydroxy oxime and neodecanoic acid in a volume ratio of 1:0.5 to 4.0.

5. The method of claim 1, wherein the synergistic solvent extraction solvent and the synergistic solvent extraction feed solution are input in a volume ratio of 1:0.5 to 2 in step (a), and
   the stirring temperature is 35° C. to 55° C. and the stirring time is 0.5 minutes to 3 minutes in step (a).

6. The method of claim 1, wherein the concentration of soda ash added in step (a) is 5% by weight to 30% by weight and pH of the solution in the reactor is 3 to 7 during the stirring.

7. The method of claim 1, wherein the step (b) of scrubbing the manganese includes: stirring the DSX synergistic solvent extraction solvent with a synergistic solvent extraction scrubbing solution, in which zinc sulfate ($ZnSO_4$) is added and dissolved, so that the manganese is removed from the solvent to the scrubbing solution.

* * * * *